US012221594B2

(12) United States Patent
Foster et al.

(10) Patent No.: US 12,221,594 B2
(45) Date of Patent: Feb. 11, 2025

(54) COMPOSITIONS AND METHODS FOR REMOVING SOIL FROM SURFACES

(71) Applicant: ECOLAB USA INC., Saint Paul, MN (US)

(72) Inventors: Tobias Neil Foster, Saint Paul, MN (US); Dirk Kullwitz, Tonisworst (DE); Beana Pathicheril, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 35 days.

(21) Appl. No.: 18/068,268

(22) Filed: Dec. 19, 2022

(65) Prior Publication Data

US 2023/0124683 A1 Apr. 20, 2023

Related U.S. Application Data

(60) Division of application No. 17/305,888, filed on Jul. 16, 2021, now Pat. No. 11,566,207, which is a (Continued)

(51) Int. Cl.
*C11D 3/04* (2006.01)
*B08B 3/04* (2006.01)
(Continued)

(52) U.S. Cl.
CPC ............ *C11D 3/3947* (2013.01); *B08B 3/042* (2013.01); *C11D 1/00* (2013.01); *C11D 1/66* (2013.01);
(Continued)

(58) Field of Classification Search
CPC .... C11D 1/00; C11D 1/66; C11D 3/04; C11D 3/06; C11D 3/08; C11D 3/10;
(Continued)

(56) References Cited

U.S. PATENT DOCUMENTS

| | | | |
|---|---|---|---|
| 5,246,612 | A | 9/1993 | Van Dijk et al. |
| 9,102,903 | B2 | 8/2015 | Reinhardt et al. |

(Continued)

FOREIGN PATENT DOCUMENTS

| | | | |
|---|---|---|---|
| EP | 0530870 | A1 | 3/1993 |
| EP | 2273006 | A1 | 1/2011 |

(Continued)

OTHER PUBLICATIONS

International Search Report and Written Opinion for International Application No. PCT/US2013/072302, 9 pages. Sep. 11, 2014.

*Primary Examiner* — Gregory R Delcotto
(74) *Attorney, Agent, or Firm* — McKee, Voorhees & Sease, PLC

(57) ABSTRACT

The present invention relates to an aqueous composition for removing soils from a surface to be cleaned, formed from water, a detergent mixture and a rinse aid, wherein the detergent mixture comprises a peroxidation catalyst and wherein the rinse aid comprises an oxygen source. Such a composition may provide a more effective cleaning behaviour. The present invention further relates to a method for removing soil from a surface to be cleaned comprising applying to the surface to be cleaned a composition according to the invention.

20 Claims, 1 Drawing Sheet

Related U.S. Application Data division of application No. 15/227,729, filed on Aug. 3, 2016, now abandoned, which is a continuation of application No. PCT/EP2013/072302, filed on Oct. 24, 2013.

(51) Int. Cl.

| | |
|---|---|
| ***C11D 1/00*** | (2006.01) |
| ***C11D 1/66*** | (2006.01) |
| ***C11D 3/08*** | (2006.01) |
| ***C11D 3/10*** | (2006.01) |
| ***C11D 3/16*** | (2006.01) |
| ***C11D 3/20*** | (2006.01) |
| ***C11D 3/33*** | (2006.01) |
| ***C11D 3/37*** | (2006.01) |
| ***C11D 3/39*** | (2006.01) |
| ***C11D 3/395*** | (2006.01) |

(52) U.S. Cl.

CPC .................. *C11D 3/04* (2013.01); *C11D 3/08* (2013.01); *C11D 3/10* (2013.01); *C11D 3/168* (2013.01); *C11D 3/2075* (2013.01); *C11D 3/33* (2013.01); *C11D 3/3757* (2013.01); *C11D 3/3765* (2013.01); *C11D 3/3902* (2013.01); *C11D 3/3917* (2013.01); *C11D 3/3932* (2013.01); *C11D 3/3945* (2013.01); *C11D 2111/14* (2024.01)

(58) Field of Classification Search

CPC ....... C11D 3/2075; C11D 3/33; C11D 3/3757; C11D 3/3765; C11D 3/3902; C11D 3/3917; C11D 3/3945; C11D 3/3947

USPC ....... 510/221, 222, 223, 224, 225, 227, 228, 510/229, 230, 232, 233, 372, 375, 376

See application file for complete search history.

(56) References Cited

U.S. PATENT DOCUMENTS

| | | | | |
|---|---|---|---|---|
| 9,546,345 | B2 | 1/2017 | Foster | |
| 2003/0114329 | A1 | 6/2003 | Wierenga | |
| 2003/0220214 | A1 | 11/2003 | Ofosu-Asante et al. | |
| 2004/0127377 | A1 | 7/2004 | Rodrigues | |
| 2005/0075258 | A1 | 4/2005 | Kessler et al. | |
| 2005/0261155 | A1 | 11/2005 | Wiedemann | |
| 2006/0030506 | A1 | 2/2006 | Song | |
| 2006/0100118 | A1 | 5/2006 | Song | |
| 2008/0000032 | A1 | 1/2008 | Wieprecht | |
| 2010/0249007 | A1 | 9/2010 | Holderbaum et al. | |
| 2011/0053819 | A1 | 3/2011 | Preuschen et al. | |
| 2011/0166055 | A1 | 7/2011 | Reinhardt et al. | |
| 2012/0184478 | A1 | 7/2012 | Maitro-Vogel et al. | |
| 2012/0204356 | A1 | 8/2012 | Bastigkeit et al. | |
| 2012/0214723 | A1 | 8/2012 | Bastigkeit et al. | |
| 2012/0289449 | A1 | 11/2012 | Adamy | |
| 2013/0139856 | A1 * | 6/2013 | Vinson ..................... | C11D 3/10 134/34 |
| 2013/0157345 | A1 * | 6/2013 | Smith ....................... | D06L 1/16 134/36 |
| 2017/0088799 | A1 | 3/2017 | Foster | |

FOREIGN PATENT DOCUMENTS

| | | | | |
|---|---|---|---|---|
| WO | 199527773 | A1 | 10/1995 | |
| WO | 199527774 | A1 | 10/1995 | |
| WO | 199533043 | A1 | 12/1995 | |
| WO | 199729172 | A1 | 8/1997 | |
| WO | 0053708 | A2 | 9/2000 | |
| WO | WO-02060998 | A2 * | 8/2002 | .............. B01J 39/05 |
| WO | 2009074403 | A1 | 6/2009 | |
| WO | 2012025740 | A1 | 3/2012 | |
| WO | 2012107187 | A1 | 8/2012 | |

* cited by examiner

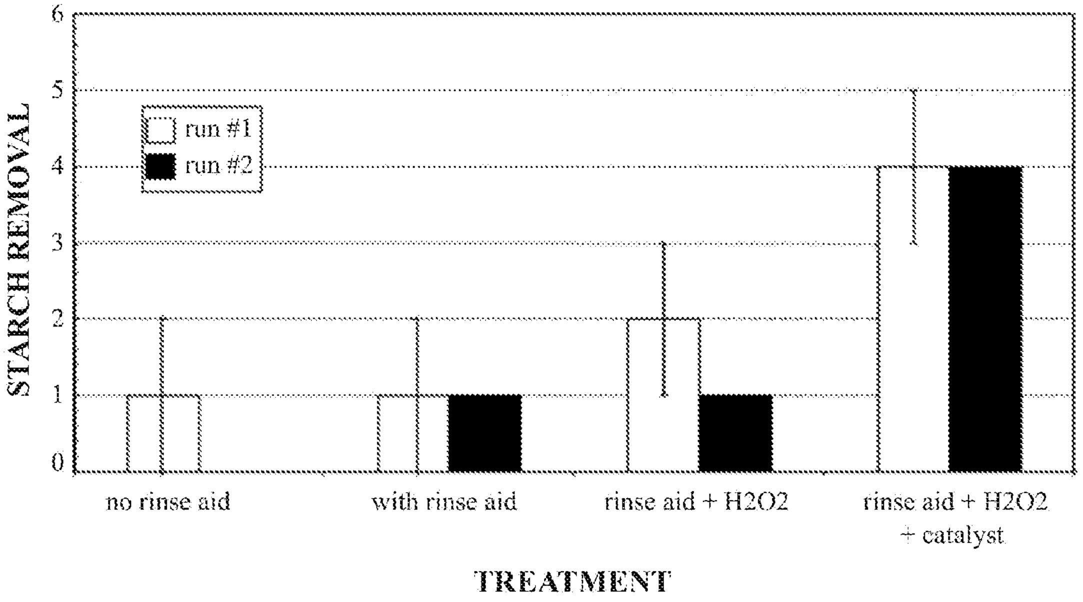
6
5
4
3
2
1
0
STARCH REMOVAL
run #1
run #2
no rinse aid
with rinse aid
rinse aid + H2O2
rinse aid + H2O2
+ catalyst
TREATMENT

COMPOSITIONS AND METHODS FOR REMOVING SOIL FROM SURFACES

CROSS-REFERENCE TO RELATED APPLICATIONS

This application is a divisional application of U.S. Ser. No. 17/305,888 filed on Jul. 16, 2021, which is a divisional application of U.S. Ser. No. 15/227,729, filed on Aug. 3, 2016, and which is a continuation of PCT/EP2013/072302 filed on Oct. 24, 2013, all of which are herein expressly incorporated herein by reference including, without limitation, the specification, claims, and abstract, as well as any figures, tables, or drawings thereof.

TECHNICAL FIELD OF THE INVENTION

The present invention relates to compositions and methods for removing soils from surfaces. The present invention particularly relates to a composition comprising a combination of both a detergent containing a peroxidation catalyst and a rinse aid containing an oxygen source particularly for removing starch soil from tableware by use of dish washers. Particularly, the present invention relates to compositions and methods for removing soils from surfaces in the field of professional dishwashing and by use of especially short washing times.

BACKGROUND OF THE INVENTION

One of the key objectives to be solved for example by institutional ware washing products is dealing with food soil being present on tableware, for example. As an example, the removal of starch containing soils, such as baked starch, as well as the removal of tea or coffee soils is a major challenge.

Removing food soils with respect to the exemplary example of removing starch soils comprises both the removal of starch from ware and the prevention of the build-up of starch layers on ware. In typical state of the art ware washing products the objective of starch removal is met by using a highly caustic detergent, while preventing the built-up of starch layers by spraying a highly alkaline solution or an acid directly onto the ware. This kind of procedure is known under the expression X-Streamclean technology.

Known from US 2012/0302490 are bleach catalyst compounds comprising bleach catalysts and organic carrier materials. The bleach catalysts are defined manganese complexes. The compounds may inter alia be used in pulverulent or tableted products such as machine dishwashing detergents, where they are used in combination with a peroxide source such as hydrogen peroxide.

U.S. Pat. No. 5,246,612 describes a machine dishwashing composition containing a peroxygen compound as the bleaching agent. The composition contains a dinuclear manganese complex with a defined formula.

Known from DE 10 2009 057 222 A1 are manganese complexes for use as bleaching catalysts in dishwashing compositions.

WO 2012/107187 A1 describes the use of manganese or iron complexes in washing and cleaning compositions in the form of granules or powder or solution or suspension for bleaching of coloured stains on hard surfaces, such as for dishwashing detergents. Such a detergent may further comprise hydrogen peroxide.

However, especially with regard to professional and fast dishwashing procedures there still is room for improvements especially regarding the efficiency of the dishwashing process.

SUMMARY OF THE INVENTION

It is an object of the present invention to provide a measure for removing soils from surfaces to be cleaned allowing simplifying the cleaning procedure and/or allowing the cleaning procedure to be more efficient.

This object is solved by a composition for removing soils from surfaces according to claim 1. This object is further solved by a method according to claim 8. Advantageous embodiments are defined in the dependent claims.

An aqueous composition for removing soils from a surface to be cleaned is formed from water, a detergent mixture and a rinse aid, wherein the detergent mixture comprises a peroxidation catalyst and wherein the rinse aid comprises an oxygen source.

According to an embodiment, the peroxidation catalyst is selected from the group consisting of manganese and iron based catalysts. In particular, MnTACN, MnDTNE, iron based catalysts comprising bispidon type ligands, FeTamL, Mn(II)oxalate, 1,2:4,5-Di-O-isopropylidene-β-D-erythro-2, 3-hexodiulo-2,6-pyranose, and Tinocat Mn catalysts may be suitable.

Further, the oxygen source the may comprise a peroxygen compound, such as a peroxide and/or a percarboxylic acid or a combination of the afore-mentioned compounds. For example, the oxygen source may only comprise and thus consist of one or more of the afore-mentioned compounds.

The detergent mixture may be provided, for example, in the form of a solid, a powder, a paste, a liquid, or a gel, these examples not being limiting the scope of the invention. Preferably, the concentrated detergent composition is provided in the form of a solid or a liquid. According to an embodiment, the solid or liquid detergent mixture may be comprised in the composition with an amount of 0.1 g/L to 10 g/L, in particular with an amount of 0.5 g/L to 3 g/L, preferably with an amount of 0.9 g/L to 2 g/L, wherein the catalyst may be present in the detergent mixture with weight fractions between 0.00001 wt. % and 1.0 wt. %, leading to a concentration of the catalyst in the composition of 0.000001 g/L to 0.1 g/L. Additionally or alternatively, the solid or liquid rinse aid may be comprised in the composition with a concentration of 0.01 g/L to 10 g/L, in particular with an amount of 0.1 g/L to 4 g/L. The rinse aid may contain the oxygen source in a weight fraction between 10 wt. % and 60 wt. %, leading to a concentration between 0.001 g/L and 6 g/L of the oxygen source in the cleaning composition.

According to a further embodiment, the detergent mixture for forming the composition may comprise at least

- about ≥20 wt.-% to ≤80 wt.-%, preferably about ≥40 wt.-% to ≤70 wt.-% of an alkalinity source, such as sodium hydroxide, potassium hydroxide, ash, metasilicate salts;
- about ≥1 wt.-% to ≤50 wt.-%, preferably about ≥1 wt.-% to ≤40 wt.-%, of chelators and/or builders, such as phosphonates, sodium tripolyphosphate, methylglycinediacetic acid (MGDA) particularly for water hardness coverage;
- about ≥1 wt.-% to ≤20 wt.-%, preferably about ≥1 wt.-% to ≤15 wt.-%, of a water conditioning agent, such as a threshold-/soil suspension polymer, particularly a polymer such as polyacrylic acid;

about ≥0.00001 wt.-% to ≤1.0 wt.-%, preferably about ≥0.001 wt.-% to ≤0.5 wt.-%, of the peroxidation catalyst particularly for soil degradation; and about ≥0.1 wt.-% to ≤20 wt.-%, preferably about ≥0.5 wt.-% to ≤15 wt.-%, defoamer.

The above-defined components may be present in the detergent mixture in an amount of equal or less than 100 wt.-%

Further, the detergent may comprise additional components such as one or more of binding agents for ensuring the integrity of the solid detergent formula; enzymes such as amylases for the degradation of starch, or lipases for the degradation of lipids, or proteases for the degradation of proteins; surfactants for an improved wetting behavior; disinfection agents, bleaching agents and/or glass/metal corrosion inhibitors. Especially with respect to liquid detergent mixtures, water can be added to the afore defined detergent mixture to reach 100 wt.-% of the detergent. The water content of the detergent mixture may thus simply determined by subtracting the amounts of the compounds used from 100 wt.-%.

According to a further embodiment the rinse aid for forming the composition may comprise about ≥10 wt.-% to ≤60 wt.-%, preferably about ≥20 wt.-% to ≤50 wt.-% of the oxygen source such as hydrogen peroxide;

about ≥0.5 wt.-% to ≤50 wt.-%, preferably about ≥1 wt.-% to ≤15 wt.-%, of a hydrotope such as sodium cumene sulfonate, sodium xylene sulfonate, particularly for assuring phase homogeneity;

about ≥0.5 wt.-% to ≤50 wt.-%, preferably about ≥1 wt.-% to ≤15 wt.-%, of a surfactant such as non-ionic surfactant, particularly for wetting purposes; and about ≥0.5 wt.-% to ≤50 wt.-%, preferably about ≥1 wt.-% to ≤15 wt.-%, of builders, such as phosphonates, sodium tripolyphosphate, methylglycinediacetic acid (MGDA).

The above-defined components may be present in the rinse aid in an amount of equal or less than 100 wt.-%.

The rinse aid might contain other components such as disinfection agents/biocides, bleaching agents and dyes. Especially with respect to liquid rinse aids, water can be added to the afore-defined rinse aid mixture to reach 100 wt.-% of the rinse aid. The water content of the rinse aid may thus simply be determined by subtracting the amounts of the compounds used from 100 wt.-%.

It has been surprisingly found that the aqueous composition which is formed from a detergent mixture with a peroxidation catalyst and rinse aid with an oxygen source may provide the advantage of significantly improving removal of soil and particularly removing of starch containing soil with short washing times, an easy and cost-saving procedure, and an environmentally friendly oxidizing system based on oxygen. Thus, the compositions of the present invention particularly provide an improved cleaning performance.

A method for removing soil from a surface to be cleaned comprises applying to the surface to be cleaned a composition like described above. Therefore, the method mainly comprises the step of providing a composition according to the invention optionally having one or more of the aforementioned optional features and applying this composition to the surface to be cleaned. Accordingly, the peroxidation catalyst is provided in a detergent mixture and the oxygen source is provided in a rinse fluid, wherein the detergent mixture and the rinse fluid are added to water, this mixture coming in contact with the surface to be cleaned.

The method may particularly be performed in a dish washer a professional dish washer system such as professional door-/hood-type dish washers or conveyor-/flight-type dish washers and/or in dishwashers with short washing times such as washing times of ≤20 min, particularly ≤15 min.

When using it in a dish washer, the method may comprise the steps of:

a) providing one or more soiled ware, particularly soiled dishes, in a dish washer;

b) performing a first washing step comprising bringing the one or more soiled ware in contact with the cleaning composition like defined above, wherein the cleaning composition contains both a detergent with a peroxidation catalyst and a rinse aid with an oxygen source;

c) performing a rinse step in which unused rinse aid solution with an oxygen source is brought in contact with the one or more soiled ware, wherein the ware is covered with the cleaning composition.

According to a further embodiment, the method, particularly according to steps b) and c), is performed when the composition is in a cycle steady state. The rinse step establishes the so-called steady state concentration of the rinse aid containing the oxygen source that is required in the aforementioned cleaning composition. For hood type machine, the steady state is established by multiple cycles of washing and rinsing, while in conveyor type machines the detergent solution in the wash tank is enriched with the rinse aid through the cascade.

It may be advantageous that the wash step (step b) is performed in a time range of about ≥20 s to ≤240 s, particularly of about ≥30 s to ≤180 s, and/or wherein the rinse step (step c) is performed in a time range of about ≥5 s to ≤120 s, particularly of about ≥8 s to ≤60 s. For example, the wash step may be performed for 40 s, whereas the rinse step may be performed for 10 s.

It has been surprisingly found that the method having the features like described above and especially using a composition comprising a detergent mixture with a peroxidation catalyst and a rinse aid with an oxygen source may provide the advantage of significantly improving removal of soil and particularly removing of starch containing soil with short washing times, an easy and cost saving procedure, and an environmentally friendly oxidizing system based on oxygen. Thus, the method of the present invention particularly provides for improved cleaning performance.

DETAILED DESCRIPTION OF THE INVENTION

The weight amount (wt.-%) is calculated on the total weight amount of the liquid cleaning composition or the respective mixtures such as detergent mixture or rinse aid, if not otherwise stated. The total weight amount of all components of the liquid cleaning composition, of the detergent mixture or of the rinse aid does not exceed 100 wt.-%.

As used herein, “weight percent,” “wt-%,” “percent by weight,” “% by weight,” and variations thereof refer to the concentration of a substance as the weight of that substance divided by the total weight of the composition and multiplied by 100. It is understood that, as used here, “percent,” “%,” and the like are intended to be synonymous with “weight percent,” “wt-%,” etc.

As used herein, the term “about” refers to variation in the numerical quantity that may occur, for example, through typical measuring and liquid handling procedures used for making concentrates or use solutions in the real world;

through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "cleaning" and particularly "washing" refers to a method or process used to facilitate or aid in soil removal, bleaching, microbial population reduction, and any combination thereof.

As used herein, "consisting essentially of" means that the methods, and compositions may include additional steps, or ingredients, but only if the additional steps, or ingredients do not materially alter the basic and novel characteristics of the claimed methods, and compositions.

The present invention refers to an aqueous composition for removing soil from a surface to be cleaned. Such a composition comprises, or is formed from, water particularly as solvent, a detergent mixture with a peroxidation catalyst and a rinse aid with an oxygen source. The combination of the peroxidation catalyst and the oxygen source provides a significantly improved cleaning behaviour especially of soils containing starch, such as baked starch, coffee and tea. Therefore, a major challenge is solved by improved cleaning or washing products, such as tableware or cutlery. A peroxidation catalyst provided in combination with an oxygen source such as hydrogen peroxide thereby advantageously serves to degrade food soil under alkaline conditions in the sump of dish washers, for example, thereby additionally preventing the built-up of new soil layers on the cleaned surfaces. In particular, the catalyzed degradation of food soil components in water can significantly be enhanced, such as the removal from even baked starch from plates. The oxygen source is thereby particularly advantageous for allowing a superb performance of the peroxidation catalyst thereby degrading food soil under alkaline conditions. The composition is thereby capable of degrading food soil components, reducing the formation of foam and further for reducing redeposition of soil on cleaned ware.

The cleaning performance was thereby in a surprising manner significantly improved by providing a peroxidation catalyst being present in a detergent mixture in combination with providing an oxygen source, such as hydrogen peroxide, and potentially a peracid, in a rinse aid.

In detail, by providing a peroxidation catalyst in a detergent and an oxygen source in a rinse aid, significant advantages with respect to stability during storage of the respective mixtures is provided. This is due to the fact that the catalyst and the oxygen source are stored in different mixtures because of which negative influences before entering the substances into a dishwasher may securely be prevented.

Apart from that, in case the composition is in a steady state, it may be provided that fresh rinse aid is added subsequently, wherein the soiled ware is wetted with the composition and thus with catalyst. This allows providing fresh rinse aid and thus fresh oxygen source and bringing this in contact directly on the surface of the ware. This allows an especially effective cleaning procedure such an especially effective starch degradation.

Furthermore, due to the fact that rinse aid with the oxygen source may be added independently from the catalyst, the catalyst may be used for an especially long washing period and thus for a huge amount of washing cycles. Therefore, the amount of catalyst required for a respective amount of washing cycles may be significantly reduced allowing the washing procedure to be especially environmental friendly and cost-saving.

A further advantage may be seen in the fact that the composition may be formed by using a single detergent that is highly effective against starch at a lowest possible alkalinity and without any third product sprayed directly onto the ware. This may be particularly advantageous due to the reduced amount of required chemicals and thus reduced costs as well as reduced amount of time due to one step being omitted. An additional benefit is the usage of the environmental friendly oxidizing system based on oxygen. Thereby it is referred to the reactivity of the oxygen source in contact with the catalyst in higher concentrations, for example providing both components at once. Without using a third component this challenge is addressed to. Thereby, the inventive concept arose by providing a concept with bringing the catalyst into the sump by means of the detergent and oxygen source by the rinse aid.

Examples for surfaces to be cleaned include hard and soft surfaces, for example of upper outer and/or inner outer surfaces of materials such as ceramic, metal, plastic and/or glas, surface that came into contact with beverages and/or food, beverages such alcoholic or non-alcoholic beverages such as beer or milk, food such as meat, vegetables and/or grain-products, coffee tea and particularly starch containing beverages and/or food.

Exemplary applications in which the methods and compositions of the present invention may be used include, but are not limited to: the food and beverage industry or applications, e.g., the dairy, cheese, sugar, and brewery industries; Health Care, Vehicle Care, Water Care, Quick Service Restaurants, Pest Elimination, International applications, Consumer Markets, Textile Care/Laundry.

For example, the composition may be used for cleaning surfaces in dish washers. For this process to work the facts are used that for hood-type dish washers the rinse aid is directly added to the sump during each cleaning cycle while for conveying-type/flight-type dish washers there is a transfer from rinse aid from the rinse tank to the main wash tank through the regeneration cascade within these machines. Within the inventive concept it is used that through these processes, a steady state concentration of peroxide containing rinse aid will be available in the sump after some cycles/running time of the dish washer, making available the required amount of peroxide for the catalyst to effectively degrade soil. It was found that the steady state concentration of a peroxide containing rinse aid in the sump is sufficient to lead to the catalyzed degradation of soil, for example starch, from the surface of products such as plates. Thus, the composition is feasible in private as well as commercial ware washing applications. However, the inventive composition is particularly suitable for professional dish-washing system and apart from that in dish washing methods having strongly reduced washing times.

A peroxidation catalyst may thereby generally be any catalyst which is configured for catalysing a oxidation reaction, or peroxidation reaction, respectively. For example, the peroxidation catalyst is selected from the group consisting of manganese and iron based catalysts. For example, the following catalysts may be used: MnTACN, MnDTNE, Iron based catalysts comprising bispidon type ligands, FeTamL, Mn(II)oxalate, 1,2:4,5-Di-O-isopropylidene-β-D-erythro-2,3-hexodiulo-2,6-pyranose, and the catalysts being commercially available under the name Tinocat Mn catalyst from BASF, for example. Of the above catalysts, MnTACN means $[Mn_2 (\mu\text{-}O)_3 L_2] [PF_6]_2$ with L=TACN=Trimethyl-1,4,7-trizacyclononane.

Further, MnDTNE means $[Mn_2 (\mu\text{-}O)_2 (\mu\text{-}CH3COO)L] Cl_2$ with L=DTNE=1,2-bis(4,7-dimethyl-1,4,7-triazacyclonone-1-yl)ethane. Further, and with regard to FeTamL, TamL means a tetra amido macrocyclic ligand.

Further, as used herein, the term "oxygen source," refers to any composition capable of generating oxygen especially in situ and in a soil, as well as in solution. In some embodiments, the active oxygen source is a compound capable of providing oxygen in situ on and in the soil upon contact with the peroxidation catalyst. The compound may be organic, or inorganic.

The oxygen source may be any compound which is able to provide oxygen for a peroxidation reaction particularly when this reaction is respectively catalyzed. In some embodiments, the active oxygen source includes at least one peroxygen compound. Peroxygen compounds including, but not limited to, peroxides and various percarboxylic acids, including percarbonates, may be used in the methods of the present invention. Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group may be saturated or unsaturated as well as substituted or unsubstituted. Medium chain peroxycarboxylic (or percarboxylic) acids may have the formula $R(CO_3H)_n$, where R is a $C_5$-$C_{11}$ alkyl group, a $C_5$-$C_{11}$ cycloalkyl, a $C_5$-$C_{11}$ arylalkyl group, $C_5$-$C_{11}$ aryl group, or a $C_5$-$C_{11}$ heterocyclic group; and n is one, two, or three. Short chain perfatty acids may have the formula $R(CO_3H)_n$ where R is $C_1$-$C_4$ and n is one, two, or three.

Exemplary peroxycarboxylic acids for use with the present invention include, but are not limited to, peroxypentanoic, peroxyhexanoic, peroxyheptanoic, peroxyoctanoic, peroxynonanoic, peroxyisononanoic, peroxydecanoic, peroxyundecanoic, peroxydodecanoic, peroxyascorbic, peroxyadipic, peroxycitric, peroxypimelic, or peroxysuberic acid, and mixtures thereof. Branched chain peroxycarboxylic acids include peroxyisopentanoic, peroxyisononanoic, peroxyisohexanoic, peroxyisoheptanoic, peroxyisooctanoic, peroxyisonananoic, peroxyisodecanoic, peroxyisoundecanoic, peroxyisododecanoic, peroxyneopentanoic, peroxyneohexanoic, peroxyneoheptanoic, peroxyneooctanoic, peroxyneononanoic, peroxyneodecanoic, peroxyneoundecanoic, peroxyneododecanoic, peracetic acid, and mixtures thereof.

According to the present invention and with regard to the peroxide, most preferred is hydrogen peroxide and particularly a peroxide such as hydrogen peroxide in combination with a peracid.

In some embodiments, compositions for use in the methods of the present invention include at least one active oxygen source. In other embodiments, compositions for use in the methods of the present invention include at least two, at least three, or at least four active oxygen sources.

The aqueous composition for removing soil from a surface to be cleaned can be formed in an advantageous but in no way limiting manner by adding a detergent mixture, such as a liquid detergent mixture, and a rinse fluid and thus the solution of the rinse aid in rinse water to water. Thereby, the rinse aid and thus, the rinse fluid, may contain the oxygen source whereas the detergent mixture may comprise the peroxidation catalyst.

In a non-limiting example, the detergent mixture for forming the active composition being in use when cleaning the surfaces to be cleaned may comprise at least

- about ≥20 wt.-% to ≤80 wt.-%, preferably about ≥40 wt.-% to ≤70 wt.-% of an alkalinity source, such as sodium hydroxide, potassium hydroxide, ash, metasilicate salts;
- about ≥1 wt.-% to ≤50 wt.-%, preferably about ≥1 wt.-% to ≤40 wt.-%, of chelators and/or builders, such as phosphonates, sodium tripolyphosphate, methylglycinediacetic acid (MGDA) particularly for water hardness coverage;
- about ≥1 wt.-% to ≤20 wt.-%, preferably about ≥1 wt.-% to ≤15 wt.-%, of a water conditioning agent, particularly a polymer such as polyacrylic acid;
- about ≥0.00001 wt.-% to ≤1.0 wt.-%, preferably about ≥0.001 wt.-% to ≤0.5 wt.-%, of the peroxidation catalyst particularly for soil degradation; and
- about ≥0.1 wt.-% to ≤20 wt.-%, preferably about ≥0.5 wt.-% to ≤15 wt.-%, defoamer.

Further, the composition, such as the detergent mixture or rinse aid, may comprise additional components such as one or more of binding agents for ensuring the integrity of the solid detergent formula; enzymes such as amylases for the degradation of starch or lipases for the degradation of lipids or proteases for the degradation of proteins; surfactants for an improved wetting behavior; disinfection agents, bleaching agents, glass/metal corrosion inhibitors, activating agents, chelating/sequestering agents, silicates, detergent fillers or binding agents, defoaming agents, anti-redeposition agents, odorants, and mixtures thereof. Especially with respect to liquid detergent mixtures, water can be added to the afore defined detergent mixture to reach 100 wt.-% of the detergent. The water content of the detergent mixture may thus simply determined by subtracting the amounts of the compounds used from 100 wt.-%.

With respect to the alkalinity source, sources of alkalinity can be organic, inorganic, and mixtures thereof. Inorganic sources may comprise hydroxides such as alkali metal hydroxide, carbonates, bicarbonates, silicates or mixtures thereof. Organic sources of alkalinity are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

Examples of proteolytic enzymes which can be employed in the cleaning composition of the invention include (with trade names) Savinase®; a protease derived from *Bacillus lentus* type, such as Maxacal®, Opticlean®, Durazym®, and Properase®; a protease derived from *Bacillus licheniformis*, such as Alcalase®, Maxatase®, Deterzyme®, or Deterzyme PAG 510/220; a protease derived from *Bacillus amyloliquefaciens*, such as Primase®; and a protease derived from *Bacillus alcalophilus*, such as Deterzyme APY. Exemplary commercially available protease enzymes include those sold under the trade names Alcalase®, Savinase®, Primase®, Durazym®, or Esperase® by Novo Industries A/S (Denmark); those sold under the trade names Maxatase®, Maxacal®, or Maxapem® by Gist-Brocades (Netherlands); those sold under the trade names Purafect®, Purafect OX, and Properase by Genencor International; those sold under the trade names Opticlean® or Optimase® by Solvay Enzymes; those sold under the tradenames Deterzyme®, Deterzyme APY, and Deterzyme PAG 510/220 by Deerland Corporation, and the like.

Preferred proteases will provide good protein removal and cleaning performance, will not leave behind a residue, and will be easy to formulate with and form stable products. Savinase®, commercially available from Novozymes, is a serine-type endo-protease and has activity in a pH range of 8 to 12 and a temperature range from 20° C. to 60° C. Savinase is preferred when developing a liquid concentrate. A mixture of proteases can also be used. For example, Alcalase®, commercially available from Novozymes, is derived from *Bacillus licheniformis* and has activity in a pH range of 6.5 to 8.5 and a temperature range from 45° C. to 65° C. And Esperase®, commercially available from Novozymes, is derived from *Bacillus* sp. and has an alkaline pH activity range and a temperature range from 50° C. to 85° C. A combination of Esperase and Alcalase is preferred when developing a solid concentrate because they form a stable solid. In some embodiments, the total protease concentration in the concentrate product is from about 1 to about 15 wt. %, from about 5 to about 12 wt. %, or from about 5 to about 10 wt. %. In some embodiments, there is at least 1-6 parts of Alcalase for every part of Esperase (e.g., Alcalase: Esperase of 1:1, 2:1, 3:1, 4:1, 5:1, or 6:1).

Detersive proteases are described in patent publications including: GB 1,243,784, WO 9203529 A (enzyme/inhibitor system), WO 9318140 A, and WO 9425583 (recombinant trypsin-like protease) to Novo; WO 9510591 A, WO 9507791 (a protease having decreased adsorption and increased hydrolysis), WO 95/30010, WO 95/30011, WO 95/29979, to Procter & Gamble; WO 95/10615 (*Bacillus amyloliquefaciens* subtilisin) to Genencor International; EP 130,756 A (protease A); EP 303,761 A (protease B); and EP 130,756 A. A variant protease is preferably at least 80% homologous, preferably having at least 80% sequence identity, with the amino acid sequences of the proteases in these references.

Mixtures of different proteolytic enzymes may be incorporated into the disclosed compositions. While various specific enzymes have been described above, it is to be understood that any protease which can confer the desired proteolytic activity to the composition may be used.

The disclosed compositions can optionally include different enzymes in addition to the protease. Exemplary enzymes include amylase, lipase, cellulase, and others.

Amylase

Exemplary amylase enzymes can be derived from a plant, an animal, or a microorganism. The amylase may be derived from a microorganism, such as a yeast, a mold, or a bacterium. Exemplary amylases include those derived from a *Bacillus*, such as *B. licheniformis, B. amyloliquefaciens, B. subtilis*, or *B. stearothermophilus*. The amylase can be purified or a component of a microbial extract, and either wild type or variant (either chemical or recombinant). Exemplary amylase enzymes include those sold under the trade name Rapidase by Gist-Brocades® (Netherlands); those sold under the trade names Termamyl®, Fungamyl® or Duramyl® by Novo; those sold under the trade names Purastar STL or Purastar OXAM by Genencor; those sold under the trade names Thermozyme® L340 or Deterzyme® PAG 510/220 by Deerland Corporation; and the like. A mixture of amylases can also be used.

Cellulases

Exemplary cellulase enzymes can be derived from a plant, an animal, or a microorganism, such as a fungus or a bacterium. Cellulases derived from a fungus include the fungus *Humicola insolens, Humicola* strain DSM1800, or a cellulase 212-producing fungus belonging to the genus *Aeromonas* and those extracted from the hepatopancreas of a marine mollusk, *Dolabella Auricula Solander*. The cellulase can be purified or a component of an extract, and either wild type or variant (either chemical or recombinant). Examples of cellulase enzymes include those sold under the trade names Carezyme® or Celluzyme® by Novo; under the tradename Cellulase by Genencor; under the tradename Deerland Cellulase 4000 or Deerland Cellulase TR by Deerland Corporation; and the like. A mixture of cellulases can also be used.

Lipases

Exemplary lipase enzymes can be derived from a plant, an animal, or a microorganism, such as a fungus or a bacterium. Exemplary lipases include those derived from a *Pseudomonas*, such as *Pseudomonas stutzeri* ATCC 19.154, or from a *Humicola*, such as *Humicola lanuginosa* (typically produced recombinantly in *Aspergillus oryzae*). The lipase can be purified or a component of an extract, and either wild type or variant (either chemical or recombinant). Exemplary lipase enzymes include those sold under the trade names Lipase P “Amano” or “Amano-P” by Amano Pharmaceutical Co. Ltd., Nagoya, Japan or under the trade name Lipolase® by Novo, and the like. Other commercially available lipases include Amano-CES, lipases derived from *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., and lipases derived from *Pseudomonas gladioli* or from *Humicola lanuginosa*. A preferred lipase is sold under the trade name Lipolase® by Novo. A mixture of lipases can also be used.

Additional Enzymes

Additional suitable enzymes include a cutinase, a peroxidase, a gluconase, and the like. Exemplary cutinase enzymes are described in WO 8809367 A to Genencor. Exemplary peroxidases include horseradish peroxidase, ligninase, and haloperoxidases such as chloro- or bromo-peroxidase. Exemplary peroxidases are also disclosed in WO 89099813 A and WO 8909813 A to Novo.

These additional enzymes can be derived from a plant, an animal, or a microorganism. The enzyme can be purified or a component of an extract, and either wild type or variant (either chemical or recombinant). Mixtures of different additional enzymes can be used.

A variety of surfactants can be used in the present composition, such as anionic, nonionic, cationic, and zwitterionic surfactants. The concentrated detergent composition can comprise 0.5 to 20% by weight surfactant based on the total weight of the concentrated detergent composition, preferably 1.5 to 15% by weight.

Suitable anionic surfactants are, for example, carboxylates such as alkylcarboxylates (carboxylic acid salts) and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, alkylether sulfates; and phosphate esters such as alkylphosphate esters.

Exemplary anionic surfactants include sodium alkylarylsulfonate, alpha-olefinsulfonate, and fatty alcohol sulfates.

Suitable nonionic surfactants are, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark Pluronic (BASF), and other like nonionic compounds. Silicone surfactants can also be used.

Suitable cationic surfactants include, for example, amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, 2-alkyl-1-(2-hydroxyethyl)-2-imidazoline; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, naphthylene-substituted quaternary ammonium chloride such as dimethyl-1-naphthylmethylammonium chloride. The cationic surfactant can be used to provide sanitizing properties.

Suitable zwitterionic surfactants include, for example, betaines, imidazolines, and propinates.

If the concentrated detergent composition is intended to be used in an automatic dishwashing or warewashing machine, the surfactants selected, if any surfactant is used, can be those that provide an acceptable level of foaming when used inside a dishwashing or warewashing machine. It should be understood that warewashing compositions for use in automatic dishwashing or warewashing machines are generally considered to be low-foaming compositions.

Suitable bleaching agents include, for example, hypochlorite, such as sodium hypochlorite or calcium hypochlorite. The bleaching agent may be present in an amount of 5 to 60% by weight based on the total weight of the concentrated detergent composition, preferably 5 to 50% by weight, most preferably 10 to 40% by weight.

The cleaning composition can include as well an activating agent which may be included to further increase the activity of the peroxygen compound. Suitable activating agents include sodium-4-benzoyloxy benzene sulphonate (SBOBS); N,N,N',N'-tetraacetyl ethylene diamine (TAED); sodium-1-methyl-2-benzoyloxy benzene-4-sulphonate; sodium-4-methyl-3-benzoyloxy benzoate; SPCC trimethyl ammonium toluyloxy benzene sulphonate; sodium nonanoyloxybenzene sulphonate, sodium 3,5,5-trimethyl hexanoyloxybenzene sulphonate; penta acetyl glucose (PAG); octanoyl tetra acetyl glucose and benzoyl tetracetyl glucose. The concentrated detergent composition may comprise an activating agent or a mixture of activating agents at a concentration of 1 to 8% by weight based on the total weight of the concentrated detergent composition, preferably 2 to 5% by weight.

The detergent composition may comprise further chelating/sequestering agents in addition to the complexing agents mentioned above. Suitable additional chelating/sequestering agents are, for example, citrate, aminocarboxylic acid, condensed phosphate, phosphonate, and polyacrylate. A chelating agent in the context of the present invention is a molecule capable of coordinating (i.e., binding) the metal ions commonly found in natural water to prevent the metal ions from interfering with the action of the other detersive ingredients of a cleaning composition. Chelating/sequestering agents can generally be referred to as a type of builder. The chelating/sequestering agent may also function as a threshold agent when included in an effective amount. The concentrated detergent composition can include 0.1 to 70% by weight of a chelating/sequestering agent based on the total weight of the concentrated detergent composition, preferably 5 to 60% by weight, more preferably 5 to 50% by weight, most preferably 10 to 40% by weight.

Suitable aminocarboxylic acids include, for example, N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA).

Examples of condensed phosphates include sodium and potassium orthophosphate, sodium and potassium pyrophosphate, sodium hexametaphosphate, and the like. A condensed phosphate may also assist, to a limited extent, in solidification of the composition by fixing the free water present in the composition as water of hydration.

The composition may include a phosphonate such as 1-hydroxyethane-1,1-diphosphonic acid CH3C(OH)[PO(OH)2]2(HEDP); amino tri(methylenephosphonic acid) N[CH2PO(OH)2]3; aminotri(methylenephosphonate), sodium salt (NaO)(HO)P(OCH2N[CH2PO(ONa)2]2); 2-hydroxyethyliminobis(methylenephosphonic acid) HOCH2CH2N[CH2PO(OH)2]2; diethylenetriaminepenta(methylenephosphonic acid) (HO)2POCH2N[CH2CH2N[CH2PO(OH)2]2]2; diethylenetriaminepenta(methylenephosphonate), sodium salt C9H(28−x)N3NaxO15P5 (x=7); hexamethylenediamine(tetramethylenephosphonate), potassium salt C10H(28−x)N2KxO12P4 (x=6); bis(hexamethylene)triamine(pentamethylenephosphonic acid) (HO2)POCH2N[(CH2)6N[CH2PO(OH)2]2]2; and phosphorus acid H3PO3.

Preferred phosphonates are 1-Hydroxy Ethylidene-1,1-Diphosphonic Acid (HEDP), aminotris(methylenephosphonic acid) (ATMP) and Diethylenetriamine penta(methylene phosphonic acid) (DTPMP).

A neutralized or alkaline phosphonate, or a combination of the phosphonate with an alkali source prior to being added into the mixture such that there is little or no heat or gas generated by a neutralization reaction when the phosphonate is added is preferred. The phosphonate can comprise a potassium salt of an organo phosphonic acid (a potassium phosphonate). The potassium salt of the phosphonic acid material can be formed by neutralizing the phosphonic acid with an aqueous potassium hydroxide solution during the manufacture of the solid detergent. The phosphonic acid sequestering agent can be combined with a potassium hydroxide solution at appropriate proportions to provide a stoichiometric amount of potassium hydroxide to neutralize the phosphonic acid. A potassium hydroxide having a concentration of from about 1 to about 50 wt % can be used.

The phosphonic acid can be dissolved or suspended in an aqueous medium and the potassium hydroxide can then be added to the phosphonic acid for neutralization purposes.

The chelating/sequestering agent may also be a water conditioning polymer that can be used as a form of builder. Exemplary water conditioning polymers include polycarboxylates. Exemplary polycarboxylates that can be used as water conditioning polymers include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers.

The concentrated detergent composition may include the water conditioning polymer in an amount of 0.1 to 20% by weight based on the total weight of the concentrated detergent composition, preferably 0.2 to 5% by weight.

Silicates may be included in the concentrated detergent composition as well. Silicates soften water by the formation of precipitates that can be easily rinsed away. They commonly have wetting and emulsifying properties, and act as buffering agents against acidic compounds, such as acidic soil. Further, silicates can inhibit the corrosion of stainless steel and aluminium by synthetic detergents and complex phosphates. A particularly well suited silicate is sodium metasilicate, which can be anhydrous or hydrated. The concentrated detergent composition may comprise 1 to 10% by weight silicates based on the total weight of the concentrated detergent composition.

The composition can include an effective amount of detergent fillers or binding agents. Examples of detergent fillers or binding agents suitable for use in the present composition include sodium sulfate, sodium chloride, starch, sugars, and C1-C10 alkylene glycols such as propylene glycol. The detergent filler may be included an amount of 1 to 20% by weight based on the total weight of the concentrated detergent composition, preferably 3 to 15% by weight.

A defoaming agent for reducing the stability of foam may also be included in the composition to reduce foaming. The defoaming agent can be provided in an amount of 0.01 to 15% by weight based on the total weight of the concentrated detergent composition. Suitable defoaming agents include, for example, ethylene oxide/propylene block copolymers such as those available under the name Pluronic N-3, silicone compounds such as silica dispersed in polydimethylsiloxane, polydimethylsiloxane, and functionalized polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate.

The composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. The anti-redeposition agent can be included in an amount of 0.5 to 10% by weight based on the total weight of the concentrated detergent composition, preferably 1 to 5% by weight.

The composition may include enzymes that provide desirable activity for removal of protein-based, carbohydrate-based, or triglyceride-based soil. Although not limiting to the present invention, enzymes suitable for the cleaning composition can act by degrading or altering one or more types of soil residues encountered on crockery thus removing the soil or making the soil more removable by a surfactant or other component of the cleaning composition. Suitable enzymes include a protease, an amylase, a lipase, a gluconase, a cellulase, a peroxidase, or a mixture thereof of any suitable origin, such as vegetable, animal, bacterial, fungal or yeast origin. The concentrated detergent composition may comprise 1 to 30% by weight enzymes based on the total weight of the concentrated detergent composition, preferably 2 to 15% by weight, more preferably 3 to 10% by weight, most preferably 4 to 8% by weight.

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), and Acid Green 25 (Ciba-Geigy).

Fragrances or perfumes that may be included in the compositions include, for example, terpenoids such as citronellol, aldehydes such as amyl cinnamaldehyde, a jasmine such as C1S-jasmine or jasmal, and vanillin.

The concentrated detergent composition may be provided, for example, in the form of a solid, a powder, a liquid, or a gel. Preferably, the concentrated detergent composition is provided in the form of a solid or a powder.

The components used to form the concentrated detergent composition can include an aqueous medium such as water as an aid in processing. It is expected that the aqueous medium will help provide the components with a desired viscosity for processing. In addition, it is expected that the aqueous medium may help in the solidification process when is desired to form the concentrated detergent composition as a solid. When the concentrated detergent composition is provided as a solid, it can, for example, be provided in the form of a block or pellet. It is expected that blocks will have a size of at least about 5 grams, and can include a size of greater than about 50 grams. It is expected that the concentrated detergent composition will include water in an amount of 1 to 50% by weight based on the total weight of the concentrated detergent composition, preferably 2 to 20% by weight.

When the components that are processed to form the concentrated detergent composition are processed into a block, it is expected that the components can be processed by a solidification technique. Then talk about the overall water range that we would expect for the solidification processes, which is 0.001%-40%.

With regard to the rinse aid for forming the composition it may contain in a non limiting example at least about ≥10 wt.-% to ≤60 wt.-%, preferably about ≥20 wt.-% to ≤50 wt.-% of the oxygen source such as hydrogen peroxide;

about ≥0.5 wt.-% to ≤50 wt.-%, preferably about ≥1 wt.-% to ≤15 wt.-%, of a hydrotope such as sodium cumene sulfonate, sodium xylene sulfonate, particularly for assuring phase homogeneity;

about ≥0.5 wt.-% to ≤50 wt.-%, preferably about ≥1 wt.-% to ≤15 wt.-%, of a surfactant such as non-ionic surfactant, particularly for wetting purposes; and about ≥0.5 wt.-% to ≤50 wt.-%, preferably about ≥1 wt.-% to ≤15 wt.-%, of chelators and/or builders, such as phosphonates, sodium tripolyphosphate, methylglycinediacetic acid (MGDA).

The rinse aid might contain other components such as disinfection agents/biocides, bleaching agents and dyes. Especially with respect to liquid rinse aids, water can be added to the afore-defined rinse aid mixture to reach 100 wt.-% of the rinse aid. The water content of the rinse aid may thus simply be determined by subtracting the amounts of the compounds used from 100 wt.-%.

However, when in use, the detergent mixture as well as the rinse aid may be used with water. The water may have a hardness which corresponds to conventional tap water, or city water, respectively. The hardness may thus lie in the range ≥0 dH to ≤80° dH, particularly in the range of 0-20° dH.

Further, the pH value may lie in the range of 9 or more, particularly in a range of 10-12. This allows the cleaning procedure to be performed especially effective.

When used in water, the detergent mixture as well as the rinse aid may be provided such that the concentrations to be used in the active composition are comparatively low. The solid or liquid detergent mixture may be comprised in the composition with an amount of 0.1 g/L to 10 g/L, in particular with an amount of 0.5 g/L to 3 g/L, preferably with an amount of 0.9 g/L to 2 g/L, wherein the catalyst may be present in the detergent mixture with an amount of 0.000001 g/L to 0.1 g/L. Additionally or alternatively, the solid or liquid rinse aid may be comprised in the composition with an amount of 0.01 g/L to 10 g/L, in particular with an amount of 0.1 g/L to 4 g/L. This may particularly be provided in case these concentrations are the concentrations in the active composition and thus in the cycle steady state, i.e. the concentration of rinse aid to be obtained after some cycles and running time of a dish-washer. Thereby it turned out that this steady state concentration of a peroxide containing rinse aid in the sump is sufficient to allow the catalyzed removal of starch from plates, for example.

In addition, various other additives or adjuvants may be present in the rinse aid and/or the detergent mixture, and thus in the cleaning composition of the present invention to provide additional desired properties, either of form, functional or aesthetic nature, for example:

a) Solubilizing intermediaries called hydrotropes may be present in the compositions of the invention of such as an aromatic hydrocarbon sulfonate, preferably xylene-, toluene-, or cumene sulfonate; or n-octane sulfonate; or their sodium-, potassium- or ammonium salts or as salts of organic ammonium bases. Also commonly used are polyols containing only carbon, hydrogen and oxygen atoms. They preferably contain from about 2 to about 6 carbon atoms and from about 2 to about 6 hydroxy groups. Examples include 1,2-propanediol, 1,2-butanediol, hexylene glycol, glycerol, sorbitol, mannitol, and glucose.

b) Nonaqueous liquid carriers or solvents may be used for varying compositions of the present invention.

c) Viscosity modifiers may be added to the compositions of the present invention. These may include natural polysaccharides such as xanthan gum, carrageenan and the like; or cellulosic type thickeners such as carboxymethyl cellulose, and hydroxymethyl-, hydroxyethyl-, and hydroxypropyl cellulose; or, polycarboxylate thickeners such as high molecular weight polyacrylates or carboxyvinyl polymers and copolymers; or, naturally occurring and synthetic clays; and finely divided fumed or precipitated silica, to list a few. In some embodiments, the compositions for use with the methods of the present invention do not include a gelling agent.

In some embodiments the hydrotrope may be selected from the group comprising of a xylene-, toluene-, or cumene sulfonate, n-octane sulfonate, and/or acids thereof and more preferred cumene sulfonate.

In some embodiments, compositions of the present invention may include a builder or builders. Builders include chelating agents (chelators), sequestering agents (sequestrants), detergent builders, and the like. The builder often stabilizes the composition or solution. In some embodiments, builders suitable for use with the methods of the present invention preferably do not complex with the activator complex. That is, the builder or builders for use with the present invention are selected such that they preferentially complex with the mineral soil broken up after the oxygen gas has been generated in situ on and in the soil, rather than with the activator complex.

Builders and builder salts may be inorganic or organic. Examples of builders suitable for use with the methods of the present invention include, but are not limited to, phosphonic acids and phosphonates, phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other builders include aluminosilicates, nitroloacetates and their derivatives, and mixtures thereof. Still other builders include aminocarboxylates, including salts of hydroxyethylenediaminetetraacetic acid (HEDTA), and diethylenetriaminepentaacetic acid.

Exemplary commercially available chelating agents for use with the methods of the present invention include, but are not limited to: sodium tripolyphosphate available from Innophos; Trilon A® available from BASF; Versene 100®, Low NTA Versene®, Versene Powder®, and Versenol 120® all available from Dow; Dissolvine D-40 available from BASF; and sodium citrate.

In some embodiments, a biodegradable aminocarboxylate or derivative thereof is present as a builder in the methods of the present invention. Exemplary biodegradable aminocarboxylates include, but are not limited to: Dissolvine GL-38® and Dissolvine GL-74 ® both available from Akzo; Trilon M® available from BASF; Baypure CX100® available from Bayer; Versene EDG® available from Dow; HIDS® available from Nippon Shakubai; Octaquest E30® and Octaquest A65® both available from Finetex/Innospec Octel.

In some embodiments, an organic chelating agent may be used. Organic chelating agents include both polymeric and small molecule chelating agents. Organic small molecule chelating agents are typically organocarboxylate compounds or organophosphate chelating agents. Polymeric chelating agents commonly include polyanionic compositions such as polyacrylic acid compounds. Small molecule organic chelating agents include N-hydroxyethylenediaminetriacetic acid (HEDTA), ethylenediaminetetraacetic acid (EDTA), nitrilotriaacetic acid (NTA), diethylenetriaminepentaacetic acid (DTPA), ethylenediaminetetraproprionic acid triethylenetetraaminehexaacetic acid (TTHA), and the respective alkali metal, ammonium and substituted ammonium salts thereof.

Aminophosphonates are also suitable for use as chelating agents with the methods of the invention and include ethylenediaminetetramethylene phosphonates, nitrilotrismethylene phosphonates, and diethylenetriamine-(pentamethylene phosphonate) for example. These aminophosphonates commonly contain alkyl or alkenyl groups with less than 8 carbon atoms.

Other suitable sequestrants include homopolymeric and copolymeric chelating agents. These include water soluble polycarboxylate polymers, i.e. polymeric compositions with pendant (—$CO_2H$) carboxylic acid groups and include polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. Water soluble salts or partial salts of these polymers or copolymers such as their respective alkali metal (for example, sodium or potassium) or ammonium salts may also be used. The weight average molecular weight of the polymers is from about 400 to about one million. Preferred polymers include polyacrylic acid, the partial sodium salts of polyacrylic acid or sodium polyacrylate having an average molecular weight within the range of 4000 to 8000.

Preferred builders for use with the methods of the present invention are water soluble. Water soluble inorganic alkaline builder salts which may be used alone or in admixture with other builders include, but are not limited to, alkali metal or ammonia or substituted ammonium salts of carbonates, silicates, phosphates and polyphosphates, and borates. Water soluble organic alkaline builders which are useful in the present invention include alkanolamines and cyclic amines.

Particularly preferred builders include PAA (polyacrylic acid) and its salts, phosphonobutane carboxylic acid, HEDP (1-Hydroxyethylidene-1,1-Diphosphonic Acid), EDTA and sodium gluconate.

In some embodiments, the builder may be a polyacrylic acid, phosphonobutane carboxylic acid, 1-hydroxyethylidene-1,1-diphosphonic acid, ethylenedinitrilotetraacetic acid, gluconic acid and/or salts thereof and preferably 1-hydroxyethylidene-1,1-diphosphonic acid.

In some embodiments, the amount of builder present in the concentrated compositions for use with the methods of the present invention is about 0.001 wt % to about 50 wt %. In some embodiments, about 0.005 wt.-% to about 30 wt.-% of builder is present.

In some embodiments of the composition of the invention a surfactant or mixture of surfactants may be used. The surfactant chosen may be compatible with the surface to be cleaned. A variety of surfactants may be used, including anionic, nonionic, cationic, and zwitterionic surfactants, which are commercially available from a number of sources. Suitable surfactants include nonionic surfactants, for example, low foaming non-ionic surfactants. For a discussion of surfactants, see Kirk-Othmer, Encyclopedia of Chemical Technology, Third Edition, volume 8, pages 900-912.

In some embodiments it may be preferred that the composition comprises at least one surfactant selected from the group comprising of a anionic surfactant and/or a non-ionic surfactant, preferably the surfactant can be selected from the group comprising of linear alkyl benzene sulfonates, alcohol sulfonates, amine oxides, alcohol ethoxylates, alkyl phenol ethoxylates, polyethylene glycol esters, EO/PO block copolymers, aminoxides, alkylbenzensulfonates, sodiumlaurylethersulfates and mixtures thereof; and most preferred the surfactant can be selected from the group comprising of aminoxides, alkylbenzensulfonates, sodiumlaurylethersulfates and mixtures thereof.

According to an embodiment the surfactant may be preferably selected from the group comprising anionic surfactant and/or non-ionic surfactant. It can be preferred that the surfactant is selected from the group comprising of linear alkyl benzene sulfonates, alcohol sulfonates, amine oxides, alcohol ethoxylates, alkyl phenol ethoxylates, polyethylene glycol esters, EO/PO block copolymers, and mixtures thereof.

In addition, the level and degree of foaming under the conditions of use and in subsequent recovery of the composition may be a factor for selecting particular surfactants and mixtures of surfactants. For example, in certain applications it may be desirable to minimize foaming and a surfactant or mixture of surfactants that provides reduced foaming may be used. In addition, it may be desirable to select a surfactant or a mixture of surfactants that exhibits a foam that breaks down relatively quickly so that the composition may be recovered and reused with an acceptable amount of down time. In addition, the surfactant or mixture of surfactants may be selected depending upon the particular soil that is to be removed.

The surfactants described herein may be used singly or in combination in the methods of the present invention. In particular, the nonionics and anionics may be used in combination. The semi-polar nonionic, cationic, amphoteric and zwitterionic surfactants may be employed in combination with nonionics or anionics. The above examples are merely specific illustrations of the numerous surfactants which may find application within the scope of this invention. It should be understood that the selection of particular surfactants or combinations of surfactants may be based on a number of factors including compatibility with the surface to be cleaned at the intended use concentration and the intended environmental conditions including temperature and pH.

Nonionic surfactants suitable for use in the composition of the present invention include, but are not limited to, those having a polyalkylene oxide polymer as a portion of the surfactant molecule. Exemplary nonionic surfactants include, but are not limited to, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and ethoxylated amines and ether amines commercially available from Tomah Corporation and other like nonionic compounds. Silicone surfactants such as the ABIL B8852 (Goldschmidt) may also be used.

Additional exemplary nonionic surfactants suitable for use in the methods of the present invention, include, but are not limited to, those having a polyalkylene oxide polymer portion include nonionic surfactants of C6-C24 alcohol ethoxylates, preferably C6-C14 alcohol ethoxylates having 1 to about 20 ethylene oxide groups, preferably about 9 to about 20 ethylene oxide groups; C6-C24 alkylphenol ethoxylates, preferably C8-C10 alkylphenol ethoxylates) having 1 to about 100 ethylene oxide groups, preferably about 12 to about 20 ethylene oxide groups; C6-C24 alkylpolyglycosides, preferably C6-C20 alkylpolyglycosides, having 1 to about 20 glycoside groups, preferably about 9 to about 20 glycoside groups; C6-C24 fatty acid ester ethoxylates, propoxylates or glycerides; and C4-C24 mono or dialkanolamides.

Exemplary alcohol alkoxylates include, but are not limited to, alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; and polyalkylene oxide block copolymers including an ethylene oxide/propylene oxide block copolymer such as those commercially available under the trademark PLURONIC (BASF-Wyandotte).

Examples of suitable low foaming nonionic surfactants also include, but are not limited to, secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactants include alkyl or benzyl-capped polyoxyalkylene derivatives and polyoxyethylene/polyoxypropylene copolymers.

An additional useful nonionic surfactant is nonylphenol having an average of 12 moles of ethylene oxide condensed thereon, it being end capped with a hydrophobic portion including an average of 30 moles of propylene oxide. Silicon-containing defoamers are also well-known and may be employed in the methods of the present invention.

Suitable surfactants may also include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance.

Anionic surfactants suitable for use with the disclosed methods may also include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionics include, but are not limited to, sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

In some embodiments, the surfactant includes linear alkyl benzene sulfonates, alcohol sulfonates, amine oxides, linear and branched alcohol ethoxylates, alkyl polyglucosides, alkyl phenol ethoxylates, polyethylene glycol esters, EO/PO block copolymers and combinations thereof.

Exemplary additional components that may be provided within the compositions used in the methods of the present invention may include builders, water conditioning agents, non-aqueous components, adjuvants, carriers, processing aids, enzymes, penetrants, antimicrobial agents, buffers, antifoamer or defoamer, respectively, binding agents, disinfection agents, bleaching agents, glass- and/or metal corrosion inhibitors, biocides, dyes, and pH adjusting agents.

In some aspects, a penetrant may be used with the methods of the present invention. The penetrant may be combined with an alkaline source in the cleaning composition, or, the penetrant may be used without an alkaline source. In some embodiments, the penetrant is water miscible.

Examples of suitable penetrants include, but are not limited to, alcohols, short chain ethoxylated alcohols and phenol (having 1-6 ethoxylate groups). Organic solvents are also suitable penetrants. Examples of suitable organic solvents, for use as a penetrant, include esters, ethers, ketones, amines, and nitrated and chlorinated hydrocarbons.

Ethoxylated alcohols are also suitable for use with the methods of the present invention. Examples of ethoxylated alcohols include, but are not limited to, alky, aryl, and alkylaryl alkloxylates. These alkloxylates may be further modified by capping with chlorine-, bromine-, benzyl-, methyl-, ethyl-, propyl-, butyl- and alkyl-groups.

Fatty acids are also suitable for use as penetrants in the methods of the present invention. Some non-limiting examples of fatty acids are C6 to C12 straight or branched fatty acids. In some embodiments, fatty acids used in the methods of the present invention are liquid at room temperature.

In some embodiments, a penetrant for use in the methods of the present invention includes water soluble glycol ethers. Examples of glycol ethers include dipropylene glycol methyl ether (available under the trade designation DOWANOL DPM from Dow Chemical Co.), diethylene glycol methyl ether (available under the trade designation DOWANOL DM from Dow Chemical Co.), propylene glycol methyl ether (available under the trade designation DOWANOL PM from Dow Chemical Co.), and ethylene glycol monobutyl ether (available under the trade designation DOWANOL EB from Dow Chemical Co.).

As an exemplary embodiment, suitable detergent mixtures may comprise, or in an exemplary and non limiting example, may consist of sodium hydroxide, polyacrylic acid, a defoamer, the peroxidation catalyst and water.

A method for removing soil from a surface to be cleaned comprises applying a composition as described above in detail to the surface to be cleaned. This may be realized by adding the respective components to water such, that suitable concentrations are present in a cyclic steady state. Therefore, the suitable concentrations may be provided after a plurality of cycles as cyclic steady state. The cyclic steady state may in a non-limiting manner be reached after ≥25 cycles to ≤75 cycles, for examples at 50 cycles.

The peroxidation catalyst is used provided in a detergent mixture and the oxygen source is used provided in a rinse fluid, wherein the detergent mixture and the rinse fluid are added to water, this mixture coming in contact with the surface to be cleaned.

In a more detailed way, the method for cleaning surfaces to be cleaned by using the composition as defined above in detail may comprise the following steps when using it in a dish washer:

a) providing one or more soiled ware, particularly soiled dishes, in a dish washer;
b) performing a first washing step comprising bringing the one or more soiled ware in contact with the cleaning composition like defined above, wherein the cleaning composition contains both a detergent with a peroxidation catalyst and a rinse aid with an oxygen source;
c) performing a rinse step in which unused rinse aid solution with an oxygen source is brought in contact with the one or more soiled ware, wherein the ware is covered with the cleaning composition.

Step a) thus comprises providing one or more soiled ware, particularly soiled dishes, in a dish washer. The dishwasher may preferably be a professional dishwasher, such as a conveyer type dish washer or a hood type dish-washer.

Further, the soiled ware may especially comprise starch soiled ware without being limited to this example.

Step b) comprises performing a first washing step comprising bringing the one or more soiled ware in contact with the cleaning composition like defined above, wherein the cleaning composition contains both a detergent with a peroxidation catalyst and a rinse aid with an oxygen source. Thus, the composition is formed by adding the peroxidation catalyst and the oxygen source separately. Further, water is added so that the composition may comprise an aqueous solution of the detergent mixture and the rinse aid. The composition is then collected in a washing tank.

According to step c), a rinse step is performed in which unused and thus fresh rinse aid solution with an oxygen source is brought in contact with the one or more soiled ware covered by the cleaning composition. According to this step, especially the oxygen source which is used in step a) is added again.

For hood type machine, the steady state is established by multiple cycles of washing and rinsing, while in conveyor type machines at which the steps b) and c) are perfomed at locally separated. The detergent solution in the wash tank is enriched with the rinse aid through the cascade.

Therefore, once the composition is formed, before each step c), fresh rinse aid is added in order to equalize the used oxygen source. When having reached the steady state, the amount of rinse aid added is comparable to the amount of rinse aid being lost in rinse processes, so that the concentration before a respective cycle and after a respective cycle is essentially the same.

Thereby, the steady state concentration of a peroxide containing rinse aid in the sump is sufficient to lead the peroxidation catalyst to achieve catalyzed removal of soils from surfaces such as starch from plates. The steady state, or cyclic steady state, respectively, particularly comprises a concentration of an oxygen source and a peroxidation catalyst being present after some, particularly after 50, cleaning cycles and thus steps a) to c) in the wash tank of a hood-type dish washer. Therefore, especially step c) is performed under conditions and thus concentrations of the cyclic steady stare.

The above method allows bringing this in contact directly on the surface of the ware, which in turn provides an especially effective cleaning procedure. Furthermore, due to the recycling of the washing solution by collecting it in a tank, the catalyst may be used for a huge amount of washing cycles minimizing the amount of catalyst used.

Thereby, only short washing times are required for cleaning the surfaces making the method particularly suitable as well for commercial applications. As a non-limiting example, the wash step is performed in a time range of about ≥20 s to ≤240 s, particularly of about ≥30 s to ≤180 s, and the rinse step is performed in a time range of about ≥5 s to ≤120 s, particularly of about ≥8 s to ≤60 s. A complete dishwashing cycle may thus be finished in a time range of less than 10 minutes, particularly less than 6 minutes, especially preferred less than 1 minute.

The present invention is more particularly described in the following examples and in the FIGURE that are intended as illustrations only. Unless otherwise noted, all parts, percentages, and ratios reported in the following examples are on a weight basis, and all reagents used in the examples were obtained, or are available, from the chemical suppliers described below, or may be synthesized by conventional techniques.

BRIEF DESCRIPTION OF THE DRAWING

Additional details, features, characteristics and advantages of the object of the invention are disclosed in the subclaims, the FIGURE and the following description of the respective FIGURE and examples, which—in exemplary fashion—show several embodiments and examples of the invention.

In the drawing:

FIG. 1 is a diagram showing the improved cleaning behaviour of the inventive composition and method.

For performing test methods in order to prove the inventive effect, the following materials were used:

Detergent: 89.7 wt. % sodium hydroxide, 1.3 wt. % complexing agent, 9.0 wt. % polyacrylate; rinse aid (without oxygen source): 2.8 wt. % sodium cumene sulfonate, 10.2 wt. % non-ionic surfactant, 2 wt. % complexing agent, ad 100 wt. % DI-water; Hydrogen peroxide: 50 wt. % solution, Sigma Aldrich (lot #BCBD7137V); rinse aid (with hydrogen peroxide): 40 wt. % hydrogen peroxide, 1.7 wt. % sodium cumene sulfonate, 6.1 wt. % non-ionic surfactant, 1.2 wt. % complexing agent, ad 100 wt. % DI-water; catalyst: Dragon-PF6: Catexel (batch 2008/001), namely MnTACN=$[Mn_2(\mu\text{-}O)_3 L_2][PF_6]_2$ with L=TACN=Trimethyl-1,4,7-trizacyclononane.

To obtain the plates with starch soil, a starch solution is heated to boiling. After cooling down, the solution is dosed onto each plate and coated onto the plate using a brush. After this, the plates are dried in an oven.

Before the experiments, a fresh peroxide containing rinse aid was prepared being a 30 wt. % solution of the aforementioned rinse aid containing hydrogen peroxide. For the baseline experiments, a 30 wt.-% aqueous solution of the rinse aid composition without hydrogen peroxide was prepared. In addition, a fresh solution of the catalyst in DI-water with a catalyst concentration of 0.2 wt % was prepared and shaken to dissolve the catalyst completely.

The cleaning performance test was applied comprising three wash cycles (i.e. 1×3-pass of 1 starch plate), with a randomized test program shown in table 1. The experiments were conducted using a Meiko DV 80.2 hood type dish washer with a standard program of 60 sec. total time (45 sec. wash step, 9 sec. rinse step, 3.2 l rinse volume) leading to short total cleaning times of only 2-3 minutes per plate that are good for professional ware washing processes.

In all cases, the detergent and, when applied, the rinse aid solution and the catalyst solution, were added manually to the wash tank, with the mass calculated from the desired concentration (0.001 g/L=1 ppm for the catalyst) and the volume of water added to the wash tank, as measured by the water meter. Thereby, the steady state mass of the respective rinse aid in the wash tank was calculated through the approximate relation $m_{RA,st}=C_{RA}*V_{tank}$, with $C_{RA}$=0.5 g/L being the concentration of rinse aid in the rinse step ($V_{tank}$=22 l). After adding the respective components to the wash tank, the sump solution was stirred for 30 sec. with a long spatula to ensure dissolution of the additives.

When the rinse aid was included in the rinse step, the external rinse aid solution (concentration 30 wt. % of the respective rinse aid composition in water) was added to the rinse water stream with an external pump (Topmater R47; used at a setting that doses a concentration of 1.5 g/L of a chosen liquid into the rinse water stream) to give concentration of 0.5 g/L of the rinse aid in the rinse water. After each cycle, additional detergent and, if applied, catalyst solution, were added to the wash tank to compensate the dilution of the wash tank solution through the rinse volume. It may be noted that no additional rinse aid solution needs to be added as this has been introduced in the required level through the rinse step.

Table 1 shows test examples performed with a water hardness of approximately 11.8° dH. All experiments are steady state experiments.

TABLE 1

| run # | detergent conc. [g/L] | rinse aid | catalyst conc. [g/L] |
|---|---|---|---|
| 0 | 1 | none | 0 |
| 1 | 1 | without $H_2O_2$ | 0 |
| 2 | 1 | without $H_2O_2$ | 0 |
| 3 | 1 | with $H_2O_2$ | 0 |
| 4 | 1 | with $H_2O_2$ | 0.001 |
| 5 | 1 | with $H_2O_2$ | 0 |
| 6 | 1 | with $H_2O_2$ | 0.001 |

The starch plates obtained after the different cleaning performance tests were rated semi-quantitatively according to the percentage of starch removal, with the results for the different experimental conditions shown in Table 2.

TABLE 2

| steady state experiments water hardness~11.8°dH | | | | |
|---|---|---|---|---|
| run # | rinse aid | catalyst conc. [g/L] | rating | % starch removal |
| 0 | none | 0 | 1 | 0 |
| 1 | without $H_2O_2$ | 0 | 1 | 0 |
| 2 | without $H_2O_2$ | 0 | 1 | 0 |
| 3 | with $H_2O_2$ | 0 | 2 | 5 |
| 5 | with $H_2O_2$ | 0 | 1 | 0 |
| 4 | with $H_2O_2$ | 0.001 | 4 | 40 |
| 6 | with $H_2O_2$ | 0.001 | 4 | 40 |

It can be seen from the data in table 2 that there is no removal of starch in the baseline tests (run #0, 1 and 2 in table 2) done i) without any catalyst (detergent level of 1.0 g/L) and ii) without any rinse aid, or with peroxide-free rinse aid (dosage of 0.5 g/L in the rinse water). Similarly poor, although in one case slightly improved starch removal is observed when the detergent composition without any catalyst is applied in combination with the rinse aid that contains hydrogen peroxide.

The rating values of the other baseline experiments were obtained from results of experiments 0, 2 and 5 (see table 1). The results are summarized in FIG. 1 after semi quantitative rating of the starch results as a function of the applied treatment like will be described in detail down below. According to FIG. 1, runs 1 and 2 mean two respective runs under the same conditions.

When using the above described detergent at a level of 1.0 g/L without any catalyst, and the bare rinse aid, i.e. without hydrogen peroxide, at a dosage of 0.5 g/L in the rinse water it could be seen that hardly any starch was removed under these base conditions, since the original thick crusty layer of starch, visible as thick dark black layer on the plate, is still remaining on the plate. In fact, nothing of the original starch soil has been removed under these conditions. This was the same result as compared to a run with a conventional detergent only, like can be seen in the first and second bar arrangements.

Further, according to a second baseline experiment, again the detergent was applied at a level of 1.0 g/L without any catalyst, but now using a 40 wt.-% solution of hydrogen peroxide in rinse aid, used at a dosage of 0.5 g/L in the rinse water. After this treatment, most of the area of the plate that was initially covered by starch soil is still covered by the original thick and crusty layer of starch. Still, in this case thin blue-grey stripes can be observed that interrupt the thick dark black starch layers. These blue-grey stripes indicate a more complete starch removal in these regions, i.e. locally better cleaning result compared to the larger are of almost no removal. This is visualized in the third bar arrangement in FIG. 1.

According to a further experiment, the results obtained when the detergent is used at a level of 1.0 g/L with the catalyst Dragon-PF6 being dosed at a level of 0.001 g/L into the wash tank, again in combination with a 40 wt. % solution of hydrogen peroxide in as rinse aid, used at a dosage of 0.5 g/L in the rinse water. As it could clearly be seen only minor areas of the plates are covered with the original thick and crusty layer of starch after this treatment. Instead, the larger part of the area that was initially covered by starch soil is covered with the blue-grey thin starch layer after this treatment, indicating the removal of the thick starch layers in these regions. This is shown in the fourth bar arrangement of FIG. 1.

Therefore, the removal of starch is dramatically improved even at short washing times when the detergent composition with the catalyst MnTACN is used (detergent level of 1.0 g/L, catalyst being dosed separately into the wash tank at a level of 0.001 g/L) in combination with the rinse aid containing hydrogen peroxide (rinse aid dosage of 0.5 g/L in the rinse water). Here, 40% of the starch is removed, compared to no starch removal in all the baseline experiments. All these findings are summarized in FIG. 1. The error bars correspond to an experimental error of ±1 that was assumed as an estimate for the experimental uncertainty of this method using a rating scale with integer-resolution. Thus, the data presented in FIG. 1 nicely shows the significant improvement of starch removal by using the combination of the MnTACN catalyst in the detergent and a rinse aid that contains hydrogen peroxide.

To summarize, in the presented experiments it was observed that the removal of starch baked on plates is dramatically improved when the commercially available catalyst MnTACN (=[Mn2 (μ-O)3 L2] [PF6]2 with L=TACN=Trimethyl-1,4,7-trizacyclononane) was used in combination with hydrogen peroxide in the rinse aid, compared to the respective baseline experiments without any catalyst or the peroxide-catalyst-combination. Thereby, a peroxide-containing rinse aid was added to the sump in the so-called steady state concentration, i.e. with a concentration of a peroxide-containing rinse aid in the wash tank of the dish washer that is established after multiple (typically ca. 50) cleaning cycles. Thereby it turned out that this steady state concentration of a peroxide-containing rinse aid in the sump is sufficient to lead to the catalyst-supported removal of starch from plates. In addition, this effect was observed in short cleaning times of only 2-3 minutes per plate that are typical for professional ware washing processes. The experiments were performed using city water (water hardness ~12° dH).

Cleaning performance experiments using the combination of the MnTACN catalyst in the detergent and a rinse aid that contains hydrogen peroxide have shown the process of improving the cleaning performance through a catalyst in a detergent in combination with an oxygen source within the rinse aid can be successfully applied compared to a solution without catalyst. This is proven by the observation that this mentioned combination dramatically improves the removal of starch from plates, compared to the baseline experiments run without the catalyst. Importantly, from the way the experiments were performed it can be excluded that the improved results in starch removal are just related to a bleaching of the back dye by the peroxide.

What is claimed is:

1. A cleaning system for removing soil from a surface during a warewash cleaning cycle comprising:

a cleaning composition comprising:

(a) a detergent mixture comprising about ≥20 wt. % to ≤80 wt. % of an alkalinity source, about ≥1 wt. % to ≤50 wt. % of one or more chelators, about ≥1 wt. % to ≤20 wt. % of a water conditioning agent, about ≥0.00001 wt. % to ≤1.0 wt. % of a peroxidation catalyst, and about ≥0.1 wt. % to ≤20 wt. % of a defoamer; and (b) a first rinse aid comprising about ≥20 wt. % to ≤50 wt. % of an oxygen source, about ≥1 wt. % to ≤15 wt. % of a hydrotrope, about ≥1 wt. % to ≤15 wt. % of a surfactant, and about ≥1 wt. % to ≤15 wt. % of one or more additional chelators; and a rinse step composition comprising:

(a) a second rinse aid comprising about ≥10 wt. % to ≤60 wt. % of an oxygen source, about ≥0.5 wt. % to ≤50 wt. % of a hydrotrope, about ≥0.5 wt. % to ≤50 wt. % of a surfactant, and about ≥0.5 wt. % to ≤50 wt. % of one or more additional chelators;

wherein the cleaning system removes soil from the surface during a wash cycle of less than 10 minutes, and wherein the detergent mixture, first rinse aid, and rinse step composition are kept separate prior to use of the cleaning system.

2. The cleaning system of claim 1, wherein the cleaning composition removes soil from the surface in a time range of between about ≥20 seconds to ≤240 seconds.

3. The cleaning system of claim 1, wherein the rinse step composition removes soil from and/or rinses the surface in a time range of between about ≥5 seconds to ≤120 seconds.

4. The cleaning system of claim 1, wherein the peroxidation catalyst is MnTACN, MnDTNE, a bispidon ligand, FeTamL, Mn(II)oxalate, 1,2:4,5-Di-O-isopropylidene-β-D-erythro-2,3-hexodiulo-2,6-pyranose, or a Mn bleaching catalyst.

5. The cleaning system of claim 1, wherein the oxygen source comprises a peroxygen compound.

6. The cleaning system of claim 5, wherein the peroxygen compound is a peroxide and/or a percarboxylic acid.

7. The cleaning system of claim 1, wherein the alkalinity source is an alkali metal hydroxide, a carbonate, a silicate, or a combination thereof.

8. The cleaning system of claim 7, wherein the alkalinity source is an alkali metal hydroxide.

9. The cleaning system of claim 1, wherein the alkalinity source is sodium hydroxide; the chelant is a phosphonate, sodium tripolyphosphate, methylglycinediacetic acid, or a combination thereof; the water conditioning agent is a polyacrylic acid; the defoamer is an ethylene oxide/propylene oxide block copolymer; the peroxidation catalyst is Mn(II) oxalate; the oxygen source is hydrogen peroxide; and the hydrotrope is sodium cumene sulfonate.

10. The cleaning system of claim 1, wherein the cleaning composition is diluted to form an aqueous solution, and wherein the aqueous solution comprises the detergent mixture at a concentration of ≥0.1 g/L to ≤10 g/L and the first rinse aid at a concentration of ≥0.000001 g/L to ≤0.1 g/L.

11. A steady state cleaning system for removing soil from a surface during a warewash cleaning cycle comprising:

a cleaning composition comprising:

(a) a detergent mixture comprising about ≥20 wt. % to ≤80 wt. % of an alkalinity source, about ≥1 wt. % to ≤50 wt. % of one or more chelators, about ≥1 wt. % to ≤20 wt. % of a water conditioning agent, about ≥0.00001 wt. % to ≤1.0 wt. % of a peroxidation catalyst, and about ≥0.1 wt. % to ≤20 wt. % of a defoamer; and (b) a first rinse aid comprising about ≥20 wt. % to ≤50 wt. % of an oxygen source, about ≥1 wt. % to ≤15 wt. % of a hydrotrope, about ≥1 wt. % to ≤ 15 wt. % of a surfactant, and about ≥1 wt. % to ≤15 wt. % of one or more additional chelators; and a rinse step composition comprising:

(a) a second rinse aid comprising about ≥10 wt. % to ≤60 wt. % of an oxygen source, about ≥0.5 wt. % to ≤50 wt. % of a hydrotrope, about ≥0.5 wt. % to ≤ 50 wt. % of a surfactant, and about ≥0.5 wt. % to ≤50 wt. % of one or more additional chelators;

at least one subsequent cleaning composition comprising:

(a) a subsequent detergent mixture comprising about ≥20 wt. % to ≤80 wt. % of an alkalinity source, about ≥1 wt. % to ≤50 wt. % of one or more chelators, about ≥1 wt. % to ≤20 wt. % of a water conditioning agent, about ≥0.00001 wt. % to ≤ 1.0 wt. % of a peroxidation catalyst, and about ≥0.1 wt. % to ≤20 wt. % of a defoamer; and (b) a subsequent first rinse aid comprising about ≥20 wt. % to ≤50 wt. % of an oxygen source, about ≥1 wt. % to ≤15 wt. % of a hydrotrope, about 1 wt. % to ≤15 wt. % of a surfactant, and about ≥1 wt. % to ≤15 wt. % of one or more additional chelators; and at least one subsequent rinse step composition comprising:

(a) a subsequent second rinse aid comprising about ≥10 wt. % to ≤60 wt. % of an oxygen source, about ≥0.5 wt. % to ≤50 wt. % of a hydrotrope, about ≥0.5 wt. % to ≤50 wt. % of a surfactant, and about ≥0.5 wt. % to ≤50 wt. % of one or more additional chelators;

wherein the steady state cleaning system removes soil from the surface during one or more wash cycles, wherein each wash cycle lasts less than 10 minutes, and wherein the detergent mixture, first rinse aid, and rinse step composition are kept separate prior to use of the cleaning system.

12. The cleaning system of claim 11, wherein the cleaning composition removes soil from the surface in a time range of between about ≥20 seconds to ≤240 seconds.

13. The cleaning system of claim 11, wherein the rinse step composition removes soil from and/or rinses the surface in a time range of between about ≥5 seconds to ≤120 seconds.

14. The cleaning system of claim 11, wherein the peroxidation catalyst is MnTACN, MnDTNE, a bispidon ligand, FeTamL, Mn(II)oxalate, 1,2:4,5-Di-O-isopropylidene-β-D-erythro-2,3-hexodiulo-2,6-pyranose, or a Mn bleaching catalyst.

15. The cleaning system of claim 11, wherein the oxygen source comprises a peroxygen compound.

16. The cleaning system of claim 15, wherein the peroxygen compound is a peroxide and/or a percarboxylic acid.

17. The cleaning system of claim 11, wherein the alkalinity source is an alkali metal hydroxide, a carbonate, a silicate, or a combination thereof.

18. The cleaning system of claim 17, wherein the alkalinity source is an alkali metal hydroxide.

19. The cleaning system of claim 11, wherein the cleaning system comprises ≥25 subsequent cleaning compositions.

20. The cleaning system of claim 11, wherein the cleaning system comprises at least 50 subsequent cleaning compositions.

* * * * *